May 29, 1923.
A. KINGSBURY
ELECTRICALLY INSULATED BEARING
Filed Jan. 19, 1920
1,456,804
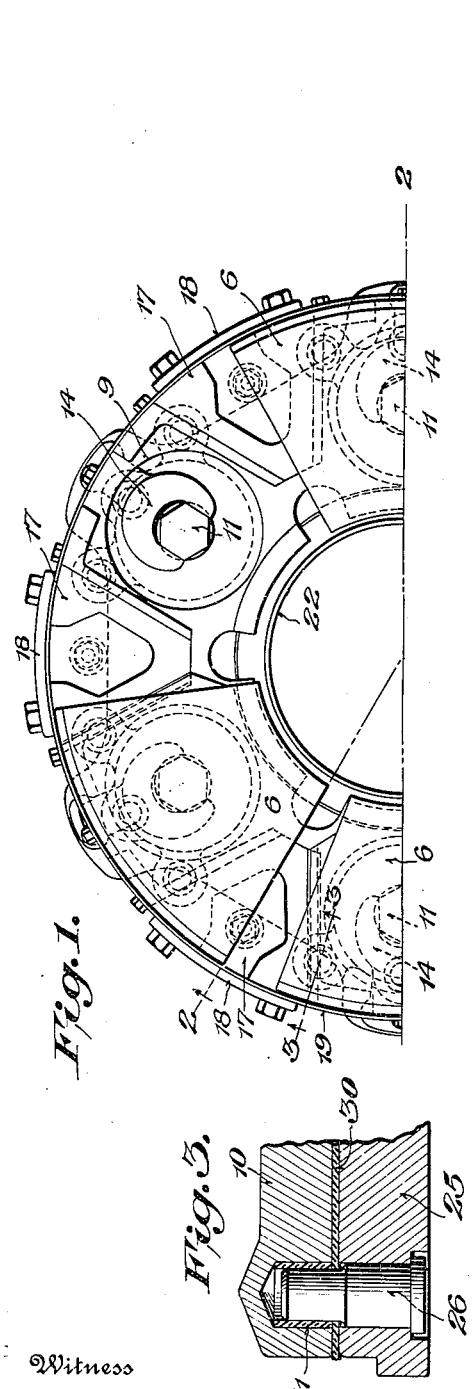
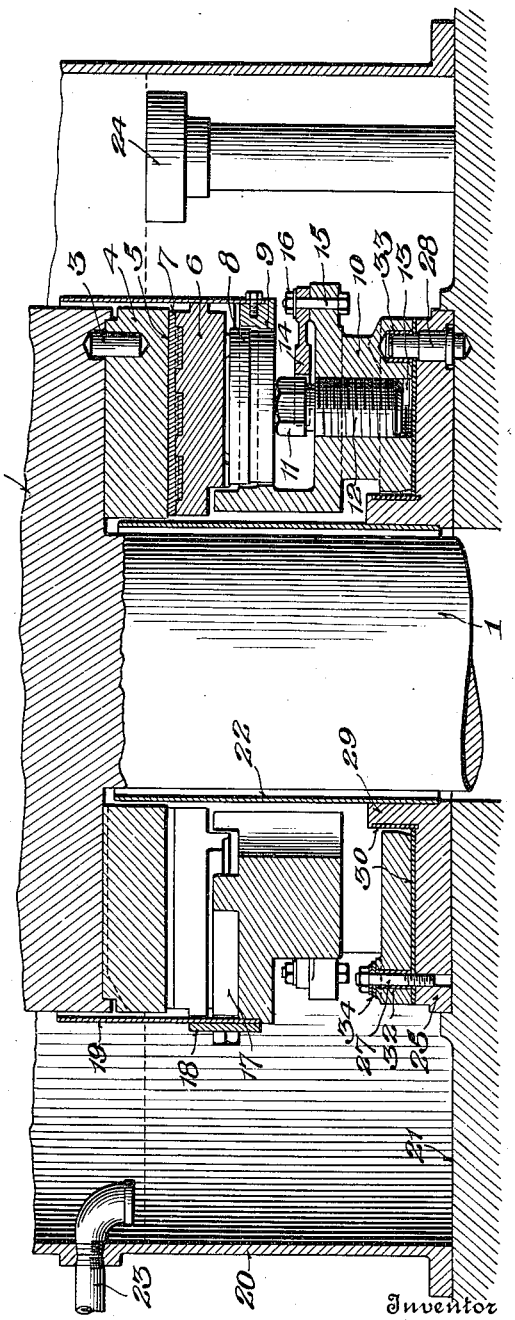
Inventor
Albert Kingsbury,
By Mauro, Cameron, Lewis & Kerkam
Attorneys
Witness Patented May 29, 1923.

1,456,804

UNITED STATES PATENT OFFICE.

ALBERT KINGSBURY, OF PITTSBURGH, PENNSYLVANIA.

ELECTRICALLY-INSULATED BEARING.

Application filed January 19, 1920. Serial No. 352,364.

*To all whom it may concern:*

Be it known that I, ALBERT KINGSBURY, a citizen of the United States, and a resident of Pittsburgh, Pennsylvania, have invented new and useful Improvements in Electrically-Insulated Bearings, which invention is fully set forth in the following specification.

This invention relates to bearings, and more particularly to bearings for shafts forming a part of or connected to electrical apparatus. While capable of a wide variety of uses, the present invention has particular utility when used in conjunction with thrust bearings of the type disclosed in my prior patents.

In the operation of electrical apparatus, such for example as large generators, stray currents are frequently generated in the machine elements and, to prevent injury to the bearing surfaces associated with the shaft of such apparatus, it is often necessary to insulate the bearing so as to prevent the stray currents flowing through said bearing surfaces. As bearings, particularly thrust bearings, are frequently supplied independently of the electrical apparatus per se, the manufacturer of said electrical apparatus cannot be depended upon to provide for the proper insulation of said bearings. It is an object of this invention to provide a thrust bearing with electrical-insulating means which constitutes a component part of the bearing structure itself, so as to assure the proper protection of the bearing surfaces against injury by the passage of stray currents therethrough from other parts of the apparatus.

As the assembling of the parts and the mounting of the bearing is frequently done by the purchaser of the bearing and electrical apparatus, it is desirable that the insulating means be so arranged as to insure against incomplete insulation, or incorrect location of the insulation, when the parts are assembled and mounted in position. Furthermore, it is desirable that the insulating means be undisturbed when the bearing parts on the electrical apparatus are disassembled for inspection or repair. It is an object of this invention to provide a thrust bearing with insulating means so arranged, as by location in or as a part of elements that normally constitute a unit, that the insulation need not be disturbed during the assembly and disassembly of the bearing parts and the electrical apparatus therewith.

Again, in order to insure that the insulating means will not fail prematurely and permit injury to the bearing surfaces by allowing the passage of stray currents therethrough, the insulation should be so arranged as not to be subjected to excessive disrupting stresses. When the bearing comprises a plurality of shoes or segments with which cooperates a substantially continuous bearing member, the latter member is subjected at any given point to a continually varying pressure as said member passes into and out of cooperative relation with the successive shoes or segments. Such a continual variation of pressure, if transmitted to the insulation, would have a deteriorating effect thereon. Furthermore, a surface bearing is subjected at starting and stopping to a rotative torque far in excess of that existing during the normal operation of the bearing and, if the insulation be so positioned that it is subjected to excessive stresses at starting and stopping, it is likely to be injured or disrupted prematurely. A further object of this invention is to provide a surface bearing with insulating means so arranged that it is not subjected to continually varying pressures, or excessive torque when starting or stopping, so as to minimize the likelihood of the injury or disruption of the insulation by the forces normally acting on the bearing.

Again, insulation as used commercially varies more or less in thickness and, if it is to be so positioned that it constitutes a part of an oil-tight joint, it has to be machined very carefully. Furthermore, even if the insulation be of uniform thickness, it is always more or less difficult to effect an oil-tight joint therewith, especially if the insulation has to be made in sections, as is frequently the case with large bearings. A further object of this invention is to so arrange the insulating means that the same forms no part of an oil-tight joint.

Another object of this invention is to so arrange the insulating means as not to interfere with the dissipation of the heat generated by the bearing surfaces during their normal operation. Yet another object is to so arrange the insulating means as to avoid injury thereto from the collection of water in contact therewith. Still another object is to avoid the necessity of careful machining of the insulation. Other objects will appear as the description of the invention proceeds.

Stated broadly, the invention as applied to a thrust bearing comprises relatively movable bearing surfaces and members for supporting or mounting the same which together constitute a bearing structure, together with insulating means which constitutes a component part of said bearing structure, said insulating means being preferably so arranged that the insulation is normally undisturbed during the mounting of the bearing and during disassembly for inspection and repair, is not subjected to disruptive stresses owing to the forces normally acting on the bearing, is not a part of any oil-tight joint therein, is so positioned as not to be injured by the collection of water in contact therewith, and does not interfere with the dissipation of heat from the bearing.

The invention is capable of receiving a variety of mechanical expressions, one of which is shown on the accompanying drawing, but it is to be expressly understood that the drawing is for purposes of illustration only and is not to be construed as a definition of the limits of the invention, reference being had to the appended claims for that purpose.

In said drawing, Fig. 1 is a partial plan view of a bearing embodying the present invention, one of the bearing segments being removed to more clearly illustrate the mounting of the same.

Fig. 2 is a vertical section on the line 2—2 of Fig. 1.

Fig. 3 is an enlarged detail of a portion of the insulating means.

Referring in detail to the drawing, wherein the same reference characters are employed to designate corresponding parts in the several figures, the invention is shown as embodied in a thrust bearing including segmental bearing members. In the form illustrated, 1 is a shaft forming a part of or connected to electrical apparatus, such for example as a generator. Shaft 1 is provided with a thrust block 2 to which is connected in any suitable way, as by one or more dowels 3, a thrust collar or runner 4 which has a bearing surface 5. Coacting with said bearing surface of the thrust collar are a plurality of bearing segments or shoes 6, shown as provided with Babbitt bearing surfaces 7.

Said bearing segments may be of any suitable construction and mounted in any suitable way. In the form shown, said segments are mounted on blocks 8 loosely positioned in apertures 9 provided in a base ring 10 which has suitable passages for the circulation of the oil. Said blocks in turn are mounted to tilt both circumferentially and radially of the shaft 1 on the spherical heads 11 of adjustable jack screws 12 threaded into apertures 13 provided in said base ring. Said jack screws 12 may be preliminarily adjusted to equitably distribute and predetermine the pressure on the bearing segments, and suitable means may be provided for locking said jack screws in their adjusted position. In the form shown, lock wrenches 14 are mounted by bolts 15 on the base ring 10 and are designed to engage the heads of the jack screws 12 and retain the same in adjusted position, said lock wrenches in turn being retained in position by lock nuts 16.

The bearing segments are prevented from rotating with the thrust collar 4 in any suitable way. In the form shown, they are positioned in recesses in the base ring, provided by projections 17 on said ring, and are retained in said recesses by members 18. An oil-splash guard ring provided with suitable apertures opposite the bearing surfaces is shown at 19.

In order that the bearing surfaces may be immersed in oil, a housing 20, suitably mounted on a frame or foundation 21, surrounds the bearing and provides an oil well which, in the form shown, is completed by an inner oil retaining ring 22 suitably attached to the base structure. Oil is supplied the well through the inlet pipe 23 and leaves the well through overflow pipe 24.

If no electrical insulation were provided, stray currents generated during the operation of the electrical apparatus might flow through the bearing members 4 and 6 between the shaft 1 and the frame or foundation 21. To properly insulate the bearing against such stray currents insulating means are provided as a component part of the bearing structure. While said insulating means may be provided in a variety of ways and take a variety of forms, the base or supporting structure for the stationary bearing members 6, in the form shown, is made in two parts, which may normally constitute a unit. To this end, the base ring 10 is provided with a sub-base ring 25 which underlies said base ring and is suitably attached thereto, as by dowels 26 and bolts 27, the entire base or supporting structure being suitably attached to the foundation or frame 21, as by dowels 28 which may also project through the sub-base ring 25 into apertures provided in the base ring 10. The sub-base ring 25 may be provided with an inner upwardly-directed flange 29 which centers the base ring 10 and carries the inner oil-retaining ring 22, to which reference has heretofore been made.

In accordance with the present invention, base ring 10 is completely insulated from sub-base ring 25 and to this end insulation 30 is interposed between said rings wherever they might otherwise come into metallic contact. Insulating collars 31 are also provided about the dowels 26 and similar collars 32 and 33 are also provided about the bolts 27 and dowels 28 respectively. Insulating washers 34 are also interposed between the heads of the bolts 27 and the base ring 10. The bearing members are therefore completely insulated from the frame or foundation 21 and no electrical circuit can be completed therethrough.

To insure that water will not collect in contact with the insulation, the base ring is provided with bosses around the holes for the bolts 27 so that the washers 34 engage portions of said base ring which are elevated with respect to the adjacent surface of said ring. To prevent water collecting in the apertures 13 for the jack screws, vent grooves or openings communicating with said apertures may be formed in the bottom face of the base ring 10, and similar means may be employed to prevent collection of water between the flange 29 and the base ring.

It will therefore be perceived that a bearing has been provided which has insulating means constituting a component part of the bearing structure, whereby no reliance need be placed on the manufacturer of the electrical apparatus or the installer of the apparatus and bearing for the proper insulation of the bearing surfaces. At the same time the insulating means is so arranged that it is normally undisturbed during the mounting of the bearing and when the bearing parts or the electrical apparatus are disassembled for inspection and repair, wherefore no responsibility is placed on the purchaser or user of properly locating the insulation at such times, because the base ring 10 and sub-base ring 25 together constitute a unit that may be assembled and tested at the factory and need not be disassembled for shipping or during assembly or disassembly of the bearing parts at the place of installation. Furthermore, owing to the arrangement of the insulation as a component part of the structure which supports the bearing segments or shoes, it is not subjected to the deteriorating effect of a continually-varying pressure; and owing to its arrangement as a component part of the supporting structure, it is not excessively stressed by the large rotative torque acting on the rotating elements when starting and stopping the shaft. Therefore, it need not be designed of a strength to resist such disrupting forces for it is not subjected to the wear and stress which would exist if the insulation were placed in the rear of the continuous bearing member 4 or as a part of the rotating elements. Additionally, the location of the insulation is such as not to require careful machining thereof—as would be the case if the insulation were placed between the thrust block and thrust collar or were made a part of an oil-tight joint for example—and is such as to avoid the care and labor that would be necessary if it were introduced into any of the joints of the bearing structure that have to be oil tight. Yet again, the insulation, owing to its arrangement, does not interfere in any respect with the dissipation of heat from the bearing through the thrust collar and block. Furthermore, the insulation together with its associated parts are so arranged and constructed that the danger of injury to the insulation from water collecting in contact therewith is entirely avoided.

While the present invention has been shown as applied to a thrust bearing of particular construction, it is to be expressly understood that the invention is not limited to use in a bearing of this type as the same is of utility wherever a bearing of any suitable construction is to be insulated against the flow of stray currents therethrough.

What I claim is:

1. In a bearing for sustaining the end thrust of the shaft of an electrical apparatus, a bearing structure including a rotatable bearing member and a stationary bearing member, a frame for supporting said bearing structure, and electrical insulation interposed in said bearing structure between said bearing members and said frame.

2. In a bearing for sustaining the end thrust of the shaft of an electrical apparatus, a rotatable bearing member, a stationary bearing member, and a supporting structure for said stationary bearing member constituting a component part of the bearing structure and provided with insulating means for preventing the flow of electrical current through said bearing members.

3. In a bearing for sustaining the end thrust of the shaft of an electrical apparatus, a rotatable bearing member, a stationary bearing member, a supporting member for said stationary bearing member, a second supporting member for said first-named supporting member, said supporting members together constituting a component part of the bearing structure, and means electrically insulating said first-named supporting member from said second supporting member.

4. In a bearing for sustaining the end thrust of a shaft, a rotatable bearing member, a stationary bearing member, and a two-part supporting structure for said stationary bearing member constituting a component part of the bearing structure and provided with electrical insulation between the parts of said supporting structure.

5. In a bearing for sustaining the end thrust of a shaft, a rotatable bearing member, a stationary bearing member, a base ring, a sub-base ring, and electrical insulation between said base and sub-base rings, said base ring, sub-base ring and insulation constituting a unit in the assembly and disassembly of the bearing.

6. A bearing for sustaining the end thrust of a shaft comprising rotatable and stationary bearing members and mounting means therefor constituting therewith a bearing structure, and electrical-insulating means constituting a component part of said bearing structure for preventing the flow of electrical current through said bearing.

7. A bearing structure for sustaining the end thrust of a shaft comprising rotatable and stationary bearing members, and electrical-insulating means constituting a component part of the bearing structure, said insulating means being so arranged that it is substantially free from the stresses arising from the action of the bearing members.

8. A bearing structure for sustaining the end thrust of a shaft comprising rotatable and stationary bearing members, and electrical-insulating means constituting a component part of the bearing structure, said insulating means being so arranged that it is normally undisturbed during the mounting and demounting of the bearing structure.

9. A bearing structure for sustaining the end thrust of a shaft comprising a rotatable bearing member, a stationary bearing member, means providing an oil well in which said bearing members are immersed, and electrical-insulating means constituting a component part of said bearing structure and positioned apart from the oil-tight joints thereof.

10. A bearing for sustaining the end thrust of a shaft comprising a rotatable bearing member, a stationary bearing member, a supporting structure for said stationary bearing member constituting a component part of the bearing structure, and means constituting a component part of said supporting structure for electrically-insulating said bearing.

11. A bearing for sustaining the end thrust of a shaft comprising a rotatable bearing member, a stationary bearing member, a two-part supporting structure for said stationary bearing member constituting a component part of the bearing structure, means connecting said parts of the supporting structure, electrical-insulating means between the parts of the supporting structure, and electrical-insulating means surrounding said connecting means.

12. A bearing structure comprising relatively rotatable bearing members comprising a plurality of bearing segments, a supporting structure for said bearing segments constituting a component part of the bearing structure, and electrical-insulating means constituting a component part of said supporting structure.

13. A bearing comprising a rotatable bearing member, a stationary bearing member comprising a plurality of bearing segments, a supporting structure on which said segments are mounted, and electrical-insulating means constituting a component part of said supporting structure.

14. A thrust bearing comprising a frame, a rotatable bearing member, a stationary bearing member, and a two-part unitary member having interposed insulation for electrically insulating said bearing members from said frame.

15. A bearing structure for sustaining the end thrust of a shaft comprising a rotatable bearing member, a stationary bearing member, a supporting structure for said stationary bearing member, and electrical insulation constituting a component part of said supporting structure and so positioned as to be substantially unstressed by the rotative torque on said rotatable bearing member.

16. A bearing for sustaining the end thrust of a shaft comprising relatively rotatable bearing members, supporting means therefor comprising a unitary structure, and electrical insulation constituting a component part of said unitary structure whereby it is normally undisturbed when mounting and demounting the bearing elements.

17. A bearing structure for sustaining the end thrust of a shaft comprising rotatable and stationary bearing members, and electrical-insulating means constituting a component part of said bearing structure, said insulating means being so positioned as not to interfere substantially with the dissipation of heat from said bearing members.

18. A bearing structure for sustaining the end thrust of a shaft comprising rotatable and stationary bearing members, and electrical-insulating means constituting a component part of said bearing structure, said insulating means being so positioned that water will not collect in contact therewith.

19. In a bearing for sustaining the end thrust of a shaft, relatively rotatable bearing members, a two-part supporting structure for one of said bearing members constituting a component part of the bearing structure, and electrical insulation between the parts of said supporting structure, said supporting structure with its insulation constituting a unit in the assembly and disassembly of the bearing structure.

20. In a bearing for sustaining the end thrust of a shaft, a bearing structure including relatively rotatable bearing surfaces, and means for supporting said bearing structure, said bearing structure comprising a two-part member constituting a unit in the assembly and disassembly of the bearing and having electrical insulation interposed between its parts electrically insulating said bearing surfaces from said supporting means.

In testimony whereof I have signed this specification.

ALBERT KINGSBURY.